United States Patent
Diakopoulos et al.

(10) Patent No.: US 7,686,682 B2
(45) Date of Patent: Mar. 30, 2010

(54) VIDEO GAME FOR TAGGING PHOTOS

(75) Inventors: Nicholas A. Diakopoulos, Atlanta, GA (US); Patrick Chiu, Menlo Park, CA (US)

(73) Assignee: Fuji Xerox Co., Ltd. (JP)

( * ) Notice: Subject to any disclaimer, the term of this patent is extended or adjusted under 35 U.S.C. 154(b) by 536 days.

(21) Appl. No.: 11/652,161

(22) Filed: Jan. 10, 2007

(65) Prior Publication Data
US 2008/0167102 A1 Jul. 10, 2008

(51) Int. Cl.
*A63F 9/24* (2006.01)
(52) U.S. Cl. .............................. 463/11; 463/9; 273/272; 273/299; 434/159; 434/167; 434/169
(58) Field of Classification Search ...................... 463/1, 463/7, 9, 10, 11, 23, 29–31, 34, 40, 41; 434/128, 434/156, 159, 161, 167, 169, 171, 172, 176, 434/307 R, 323; 273/272, 299, 429–432
See application file for complete search history.

(56) References Cited

U.S. PATENT DOCUMENTS

| | | | | |
|---|---|---|---|---|
| 4,934,711 | A * | 6/1990 | Runstein | 273/272 |
| 6,545,660 | B1 * | 4/2003 | Shen et al. | 345/156 |
| 2002/0054059 | A1 * | 5/2002 | Schneiderman | 345/700 |
| 2002/0055955 | A1 * | 5/2002 | Lloyd-Jones et al. | 707/512 |
| 2005/0153263 | A1 * | 7/2005 | De Ley et al. | 434/169 |
| 2005/0261044 | A1 * | 11/2005 | Persidsky | 463/9 |

OTHER PUBLICATIONS von Ahn, L., and Dabbish, L. (2004). Labeling images with a computer game. Proceedings of CHI '04, pp. 319-326.
von Ahn, L., Liu, R., Blum, B. (2006). Peekaboom: a game for locating objects in images. Proceedings of CHI '06, pp. 55-64.
Apples-to-Apples. Out of the Box Games, 2001-2005 version.
Boggle. (1973). Parker Brothers, Hasbro; 2005 version.
Crabtree, A., Rodden, T. and Mariani, J. (2004). Collaborating around collections: informing the continued development of photoware. Proceedings CSCW '04. pp. 396-405.
Diakopoulos, N. and Chiu, P. (2006). PhotoPlay: Collocated Ludic Photo Tagging on a Coffee Table Display. FXPAL-TR-06-003.
Flickr. http://www.flickr.com (link visited Aug. 15, 2006).
Krazit, T. (2006). "HP Labs marks 40th with high-tech coffee table". CNET News.com, Feb. 22, 2006. http://news.com.com/Hp+Labs+marks+40th+with+high-tech+coffee+table/2100-1008_3-6041758.html (link visited Aug. 28, 2006).

(Continued)

*Primary Examiner*—James S McClellan
*Assistant Examiner*—Jay Trent Liddle
(74) *Attorney, Agent, or Firm*—Sughrue Mion, PLLC (57) ABSTRACT

A multi-player solitaire or multi-player video game that generates tags for digital images. A tabletop or computer screen video game provides an enjoyable way for collocated players to view, share, talk about and, in the process tag photos. The video games can generate valuable text labels for photos with multiple levels of specificity and named entities. These labels can be used to help manage and index collections of photos for browsing and retrieval.

25 Claims, 4 Drawing Sheets

OTHER PUBLICATIONS

Magerkurth, C., Memisoglu, M., Engelke, T. and Streitz, N. (2004). Towards the next generation of tabletop gaming experiences. Proceedings Graphics Interface '04, pp. 73-80.

Mandryk, R.L., Maranan, D.S., Inkpen, K.M. (2002). False Prophets: Exploring Hybrid Board/Video Games. CHI '02 Extended Abstracts, pp. 640-641.

Morris, M.R., Paepcke, A., Winograd, T. and Stamberger, J. (2006). TeamTag: Exploring centralized versus replicated controls for co-located tabletop groupware. Proceedings of CHI '06, pp. 1273-1282.

Scattegories. Parker Brothers, Hasbro; 2003 version.

Scrabble. (1948). Parker Brothers, Hasbro; 2001 version.

Shen, C., Beardsley, P., Lesh, N., Moghaddam, B. (2001). Personal Digital Historian: User interface design. CHII '01 Extended Abstracts, pp. 29-30.

Tanaka, J.W. and Taylor, M. (1991). Object Categories and Expertise: Is the Basic Level in the Eye of the Beholder. Cognitive Psychology, 23 (3) 457-482.

Tse, E., Greenberg, S., Shen, C. and Forlines, C. (2006). Multimodal multiplayer tabletop gaming. Workshop on Pervasive Gaming Applications.

Wigdor, D. and Balakrishnan, R. (2005). Empirical Investigation into the Effect of Orientation on Text Readability in Tabletop Displays. Proceedings of ECSCW '05, pp. 205-224.

Yahoo word games. http://games.yahoo.com/hub/goto?gn=gn_word (link visited Aug. 15, 2006).

Sun, X., Chiu, P., Huang, J., Back, M., Polak, W. (2006). Implicit brushing and target snapping: data exploration and sense-making on large displays. Proceedings of AVI '06, Short Paper, pp. 258-261.

Smeaton, A. F., Foley, C., Gurrin, C., Lee, H., McGivney, S.. (2006). Collaborative searching for video using the Fischlar system and a DiamondTouch table. TableTop 2006 (IEEE Workshop on Horizontal Interactive Human-Computer Systems).

* cited by examiner

VIDEO GAME FOR TAGGING PHOTOS

BACKGROUND

1. Field of the Invention

The subject invention relates to filing and organizing digital images and, more specifically, the invention relates to tagging and organizing digital images by way of a video game so as to enable search and browsing of the digital images.

2. Related Arts

A huge amount of digital photos are being created with the ubiquitous digital cameras, camera cellphones and PDAs. An important challenge is figuring out ways to store, manage, search and browse collections of digital photos and images. The current state of the art in automatic indexing of photos and images is not sufficient to support effective browsing, except in narrow domains. This problem can be attributed to the 'semantic gap." That is, the computer is effective at analyzing low-level image features (e.g. color, texture, shape) but human users generally want to formulate queries and browse images using higher semantic concepts (e.g. people, places, named entities, etc.). By tagging images with text labels, established techniques for information retrieval such as keyword search can be applied to facilitate searching and browsing. Text metadata also is crucial for emerging applications such as photo sharing in a social network community.

Tagging images can be most effectively done by humans; however, this is a tedious chore and there is little motivation for people to do it. One recent approach that has been successful is to use a game to tag images. As demonstrated by the online image tagging project at Carnegie Mellon University, online multi-player games can be an effective way to tag images on the Web.

SUMMARY

The following summary of the invention is provided in order to provide a basic understanding of some aspects and features of the invention. This summary is not an extensive overview of the invention and as such it not intended to particularly identify key or critical elements of the invention or to delineate the scope of the invention. Its sole purpose is to present some concepts of the invention in a simplified form as a prelude to the more detailed description that is presented below.

Various embodiments of the subject invention provide multi-player video games that generate tags for digital images. According to one embodiment, a tabletop video game system provides an enjoyable way for collocated players to view, share, talk about and, in the process, tag photos. The video games can generate valuable text labels for photos with multiple levels of specificity and named entities. These labels can be used to help manage and index collections of photos for browsing and retrieval.

According to features of the invention, the video game is implemented so that collocated players sitting around a tabletop display play the game to generate the tags. According to this feature, the players are likely to be friends and family members who know one another and have taken some of the photos used in the game and may have intimate familiarity with the subject of the images.

According to another feature of the invention the game may be played on a plurality of computers, such as PC or Macs, interconnected via a network, such as an intranet or the Internet. The images to be tagged may be personal images saved on any of the computers participating in the game, or may be images stored on any machines connected to the network, such as servers storing websites.

According to yet another embodiment, the game is implemented for solitary playing on a single game console or a computer. The images may be images stored on the consol or computer, or they may be images retrieved from a network, such as from the Internet.

A game for tagging stored digital images is disclosed, comprising:

a randomizer for selecting:

m images of the stored digital images, to be used in a game round, m being an integer larger than zero; and         x letters of the alphabet, to be used in the game round, x being an integer larger than zero;

an image display for simultaneously displaying n images out of m images, n being an integer larger than zero;

a letter tray for displaying a plurality of letter tiles, each letter tile representing one of the x letters;

a highlighter for selectively highlighting one of the letter tiles according to a user pointer;

a word tray enabling a user to construct words by selecting letter tiles from the letter tray; and,     a tag generator generating tags linking words constructed in the word tray to corresponding images of the n images.

The image display may comprise a screen having n image display areas defined thereupon and wherein n=m and each of the n images is displayed on one of the display areas. The display may comprise n screens and wherein n=m and each of the n images is displayed on one of the screens. The computer game may further comprise a timer counting a time period T1, wherein after each period T1 each of the n images is displayed on a different one of the display areas. The computer game may further comprise a timer counting a time period T1, wherein after each period T1 each of the n images is displayed on a different one of the screens. The computer game may further comprise a timer counting a time period T1, wherein after each period T1 a different image of the n images is displayed on the display. The x letters may include duplicate letters but not include all of the alphabet letters. The x letter tiles may be divided to n groups of randomly selected letter tiles, and wherein the letter tiles of each of the n groups are oriented towards a corresponding one of the display areas. The timer may count a second time period T2, and wherein after each time period T2 the letter tiles of each group are oriented towards different one of the display areas. The x letter tiles may be divided to n groups of randomly selected letter tiles, and wherein the letter tiles of each of the n groups are oriented towards a corresponding one of the screens. The timer may count a second time period T2, and wherein after each time period T2 the letter tiles of each group are oriented towards different one of the screens. The computer game may further comprise a timer counting a time period T3, wherein each time period T3 designates a game round, and wherein the tag generator generates the tags only at the end of each time period T3. The computer game may further comprise a challenge indicator, enabling challenge of words constructed in the word tray. The challenge indicator may be activated by a user, and wherein when a challenge is activated, a voting mechanism is initiated, enabling users to vote on the appropriateness of a challenged word, wherein if the vote is positive, the tag generator generates a tag and if the vote is negative the tag generator does not generate a tag. The computer game may further comprise a spell checker, wherein the spell checker verifies each word constructed in the word tray and when a word cannot be confirmed by the spell checker, the challenge indicator initiates a challenge to challenge the word.

A method for generating tags for digital images is disclosed, comprising:

for each game round performing the following steps:
  a. selecting m images of the digital images and displaying the m images on m display areas;
  b. selecting n number of letters of the alphabet, and displaying each of the n letters as a letter tile in a display area defined as a letter tray;
  c. enabling users to select letter tiles and, when a user selects a letter tile, displaying the letter tile in a user's display area defined as word tray;
  d. when sufficient letter tiles have been displayed in a word tray to form a word, enabling the user to select one of the m image; and,
  e. creating a tag associating the word with the selected image and storing the tag in a storage area so as to enable searching and browsing of the digital images using the tags.

The method may further comprise the step:
  e.1. when the user selects one of the m images, disabling, for a predetermined period of time, selection of letter tiles that were used to form the word.

The selecting n number of letters at step b may comprise including duplicate letters but not including all of the alphabet letters. In step a, m may be equal to the numbers of users playing the game round. The method may further comprise the step:
  a.1. counting time periods T1 and at each end of time period T1 exchanging the display area for displaying the m images.

The method may further comprise the step:
  d.1. enabling other users to challenge the word and, if a challenge has been initiated, enabling all users to vote on the challenge.

A system for tagging digital images using a game is disclosed, comprising:
  a display having a letter tray display area, a word tray display area, and at least one image display area defined thereupon;
  at least one user input device;
  an image file for storing digital images to be tagged;
  a randomizer for selecting:
    i. At least one image to be tagged in each game round; and
    ii. a plurality of letters of the alphabet, but less than all of the letters of the alphabet;
  a video card displaying the at least one image on the image display area and each of the plurality of letters on a letter tile on the letter tray display area; and,
  a microprocessor enabling users to select letter tiles and use the letter tiles to construct words in the words tray display area, and further to construct tags associating constructed words with user selected image of the at least one image.

The display may comprise a table-top display having the letter tray display area centered thereupon and a plurality of image display areas defined about the letter tray display area. The randomizer may assign groups of the letter tiles to be displayed in an orientation towards each of the image display areas. The system may further comprise a scoring storage for storing users' scores. The system may further comprise a port enabling connection to a network and retrieving images from the network.

BRIEF DESCRIPTION OF THE DRAWINGS

The accompanying drawings, which are incorporated in and constitute a part of this specification, exemplify the embodiments of the present invention and, together with the description, serve to explain and illustrate principles of the invention. The drawings are intended to illustrate major features of the exemplary embodiments in a diagrammatic manner. The drawings are not intended to depict every feature of actual embodiments nor relative dimensions of the depicted elements, and are not drawn to scale.

DETAILED DESCRIPTION

Figure 1:
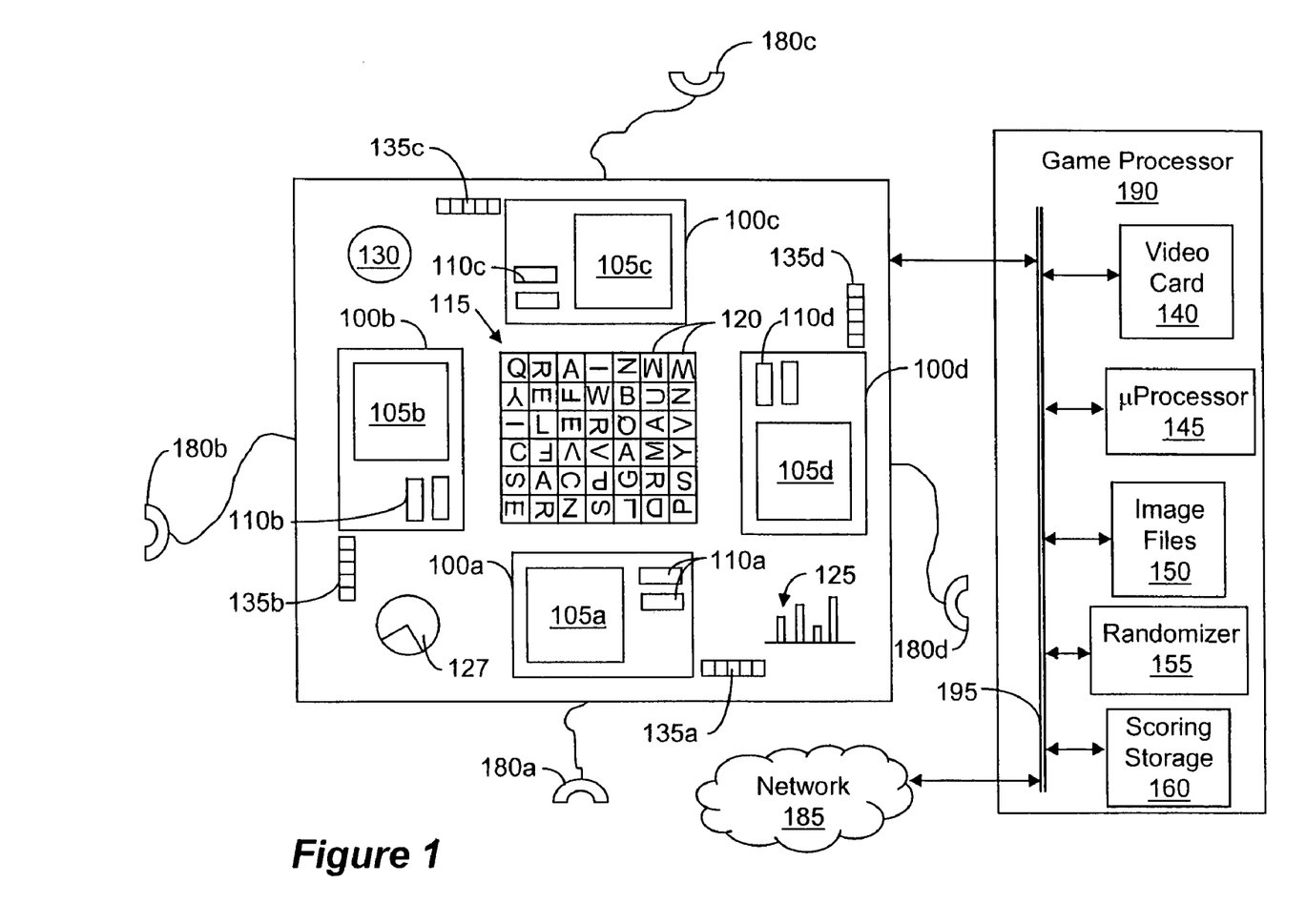
FIG. 1 depicts an embodiment of the invention implemented as a tabletop system.

FIG. 1 depicts an embodiment of the invention implemented as a tabletop system, such as conventional arcade table-top game systems or the m Table of FXPAL described in Implicit Brushing and Target Snapping: Data Exploration and Sense-making on Large Displays, Xiaohua Sun et al., AVI 2006, pp 258-261, which is incorporated herein by reference in its entirety. The embodiment of FIG. 1 is designed for four players; however, other implementations can be made for different number of players. Each player has its own playing area designated by a playing screen 100a-100d. At each round of the game, a different, randomly selected picture 105a-105d is displayed in each of the playing screens 100a-100d. In order for each player to have a good view of each photo during a game round, the four photos rotate around the center of the table every given period, for example, 15 seconds. An area 110a-110d in each screen 100a-100d is designated as a word tag and displays words that the respective player has created and attached to an image (described in more details below).

The center of the tabletop displays the letter tray 115. The letter tray displays letter tiles 120 which are selected randomly for each round. While in this embodiment the letter tray has 7×7 letter tiles, other arrangements may also be used. As exemplified in this embodiment, about a quarter of the letter tiles face each player randomly, so as to even the difficulty of reading the tiles. Also, in this embodiment at each round the letters are selected randomly, but at each round a number of letters of the alphabet are missing. That is, in this embodiment the letter tray never includes all of the letters of the alphabet, so as not to make it basically a keyboard. As shown in FIG. 1, in this embodiment some letters may be repeated. Each player has a word tray 135a-135d, for compiling letter tiles that the user selects from the letter tray 115 to create words to be linked to images. Provisions may be made to prevent each player from seeing other players' word trays, but this is not necessary.

The tabletop also includes at least one scoring area 125 indicating the score of each player. Here it is shown in a bar graph format, but other formats may also be used. At least one timer 127 is also displayed, here it is shown in a pie format, but other formats may be used. Each player has a game controller 180a-180d, which may be similar to or adopted from conventionally available game controllers such as Nintendo®, PlayStation®, X-Box®, etc. Additionally, at least one challenge button 130 is provided, which may be an actual button or just an indicator indicating that one of the players pushed the challenge button on a game controller.

The game is run by a game processor 190. The game processor 190 may be a specifically designed machine or a specially programmed general-purpose computer, such as a PC or Mac. As shown in FIG. 1, the game processor 190 includes a bus 195 to which connected a video card 140, a microprocessor 145, image files storage 150, a randomizer 155, and a scoring storage 160. As can be understood, the video card 140 conditions the signals to be displayed on the tabletop screen, the microprocessor 145 performs the calculations necessary to run the game, the image files storage area 150 contains the images to be tagged. The image file 150 may be a storage area integral to the system, such as a hard drive, or a reader such as an optical reader or a memory card reader such as a card reader for reading memory cards such as Memory Stick® or SD memory cards. The randomizer 155 is used to randomly select images from the image files storage area 150 and to randomly select letters and randomly orient them towards different users. The scoring storage area 160 is used to store the score of each player. The game processor 190 may also be connected to a network 185, such as an intranet or the Internet. In such a case, additional images may be fetched from other systems connected to the network. For example, a crawler may be provided to crawl the network and fetch images, in a manner well known in the art. The fetched images may be temporarily or permanently stored in the image files 150.

The goal for each player is to build words to associate with any of four photos on the table by selecting letter tiles from the grid. Each player has a cursor and letter tray of the same color, so that each player's action can be followed by reference to the player's particular color. The cursor is navigated around tile grid 115 using the game pad controller 180a-180d. A tile under the cursor is selected by pressing the appropriate button in the player's game controller 180a-180d. Selected tiles 120 appear in each player's word tray 135a-135d. While the design in this embodiment may have optional barriers to hide the letters from other players, testing suggests that this may not be necessary. Without barriers, even though there is nothing to prevent cheating by looking at the words others are creating; in practice players are extremely focused on the serial search task for letters in the center and rarely looked at the letter trays of others.

When a word has been formed, the player presses the "word" button on the game controller 180a-180d. This puts the user into a mode for navigating and selecting a photo 105a-105d to which the word will be attached, i.e., tagged. In this example, when the word is attached to a photo, the tiles used in that word are temporarily blocked and remain unavailable to the players for a short period of time (our experience is that 20 seconds is a good duration). Also, in this example tiles may not be repeated in a word so as to make the game more challenging and fun than allowing repeated selection of tiles. That is, once a tile is used in a word, it cannot be used again in that word.

Words attached or tagged to photos remain hidden until the end of a round (e.g., 2.5 minutes) at which time each word is revealed and evaluated collaboratively by the group. If more than one person attaches the same word to the same photo, it is cancelled out and neither player earns points for the word. Words that are cancelled due to duplication are kept as tags to the photos. In fact, their validity as tags is strengthened since these words are used by more than one person to describe the photo. Therefore, according to one embodiment such tags receive higher weight as being validated.

Each player reads off the words they came up with for each photo and if there is consensus in the group that it is a relevant word for the photo, the word earns the player points. The value of the word depends on the value of the individual letters like in Scrabble. Alternatively, a word can be scored by its length like in Boggle. A word can be challenged by any player if its relevance to a photo is questionable or if it is misspelled. Challenge is initiated by hitting the challenge button on the table or the controller, and this puts the game into challenge mode. Each player then inputs his/her vote on the relevance of the word. Input may be handled by "yes" and "no" vote buttons on the game controllers 180a-180d. Each "yes" vote increments the relevance by 1 and each "no" vote decreases the relevance by 1. Abstention does not affect the relevance. If the word earns a positive relevance score it is validated and earns the player points. The tagged words are displayed on the word tag area 110a-110d of each player. Words that are challenged are kept with their relevance score from the voting to indicate validity. This may be also handled as a form of validation that increases the weight of the tag as being validated. The winner of the game is the first player to pass a given threshold of points. In one embodiment 100 points was used for a regular game and 60 for a short game.

The particular embodiment of FIG. 1 capitalizes on the rich social interaction and group dynamics associated with traditional board games. Collocation of players allows for important interaction properties such as deixis and gesturing, one-to-many verbal communication, non-verbal communication, and mores of group play. In this embodiment these social interactions are achieved by allowing for a significant portion of the game (word relevance determination) to happen through inter-player interaction. A minimal amount of computer mediation for such things as computing scores, challenging words, tallying votes, and building words is needed.

Another aspect of the embodiment of FIG. 1 is the production of storied accounts relating to photos. By allowing players to use their own personal photos in the game, the players may use words (tags) that will trigger or induce increased sharing of stories and background about photos with other players. The desire to share personal photos may also create an additional incentive to play the game and thus generate tags.

Figure 2:
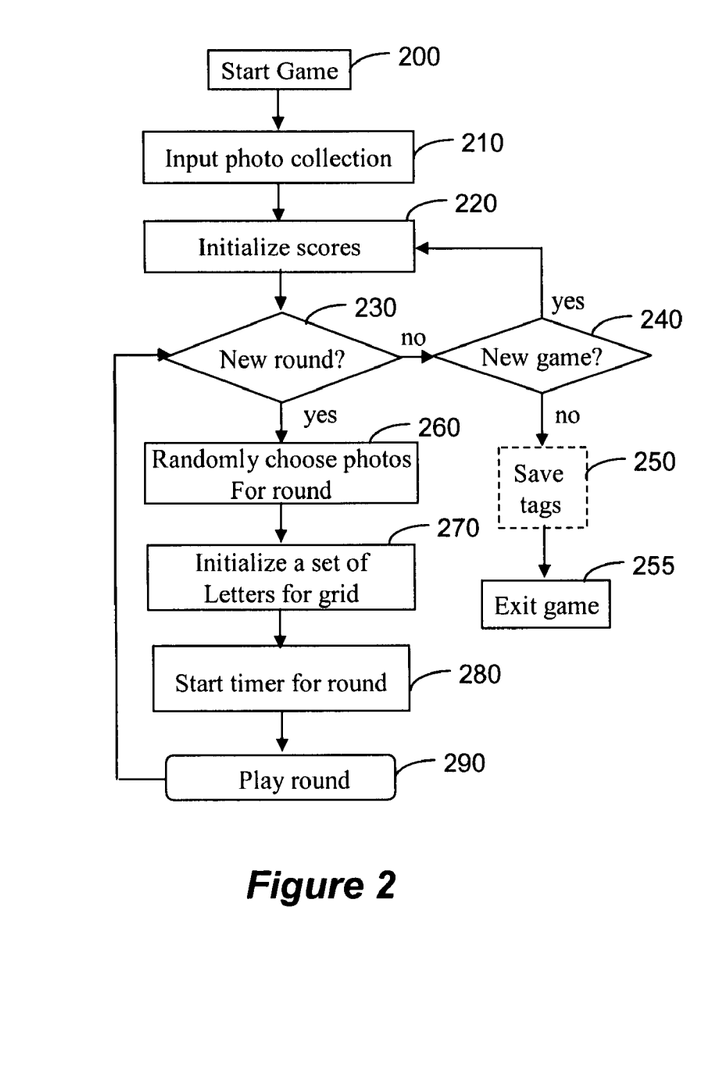
FIG. 2 is a flow diagram of the general processing performed by the game processor 190 according to an embodiment implemented for the example of FIG. 1.

FIG. 2 is a flow diagram of the general processing performed by the game processor 190 according to an embodiment implemented for the example of FIG. 1. The same processing may be performed by the other embodiments described below. In FIG. 2, the game starts at step 200, and an image collection is assembled in the image files storage area 150 at step 210. At step 220 the scores in scoring storage 160 are initialized. At step 230 it is determined whether a new round of game is to be played. If not, it is determined whether a new game is to be played (step 240). If so, the process reverts to step 220 to initialize the scores. If no new game is to be played, optionally the image tags are stored in step 250 and the game is exited in step 255. Alternatively, the tags are stored at a later stage, described with respect to FIG. 3, in which case the process simply exits at step 255.

On the other hand, if a new round is to be played at step 230, at step 260 four images are randomly selected from the collection in the image files storage area 150 and displayed on playing screens 100a-100d at 105a-105d. At step 270 random letters are selected and displayed on the letter tray 115 and at step 280 the timer 127 is initialized to start the round at step 290. The process of playing a round is illustrated in the flow chart of FIG. 3. After the round is played, the process then circularly reverts to step 230.

Figure 3:
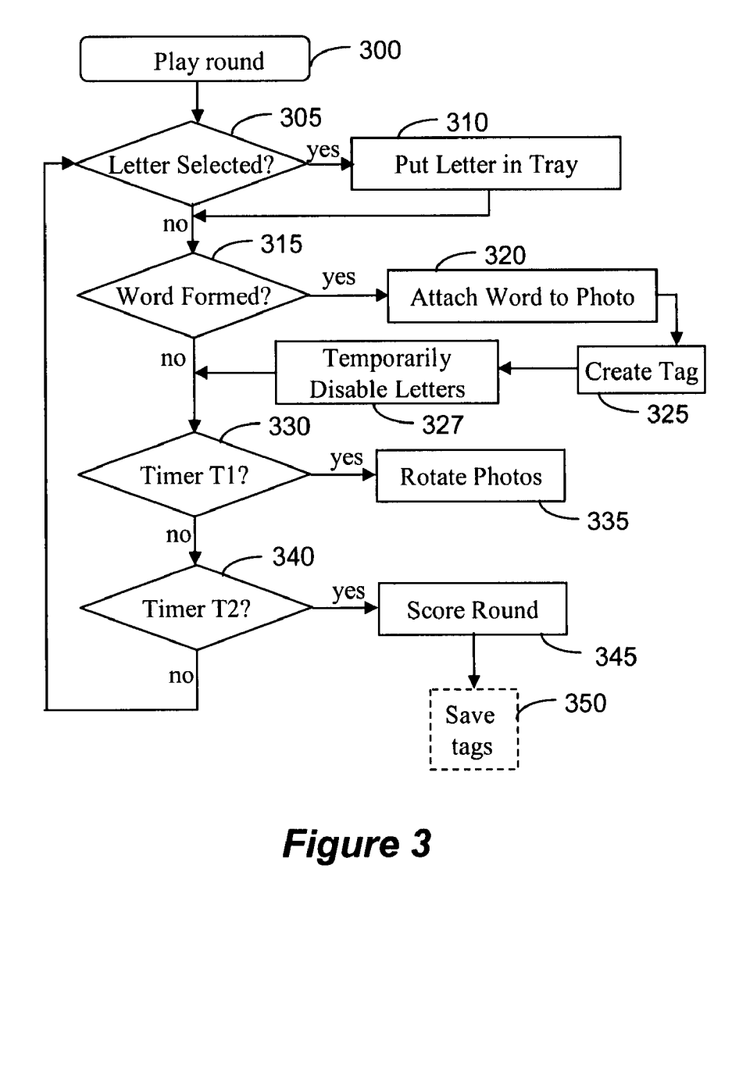
FIG. 3 is a flow diagram illustrating processing performed by the game processor 190 for a round of game according to an embodiment implemented for the example of FIG. 1.

FIG. 3 is a flow diagram illustrating processing performed by the game processor 190 for a round of game according to an embodiment implemented for the example of FIG. 1. The round starts at step 300 and in step 305 it is determined whether a letter tile 120 was selected. If so, the letter tile 120 is placed in the player's word tray 135a-135d at step 310. The process proceeds to step 315 (from either step 305 or step 310), wherein it is determined whether a word was formed. If so, the word is linked to an image 105a-105d in step 320 and a tag is created in step 325. The letters that were selected to form the word are then temporarily disabled in step 327 and the process proceeds to step 330. At step 330 the timer is interrogated to determine whether the time period for image rotation has been reached. If so, the images 105a-105d are rotated in step 335 and the process proceeds to step 340. By rotating the image it is meant, for example, that the image displayed at 105a will be displayed at 105b, the image displayed at 105b will be displayed at 105c, etc. In step 340 the timer is interrogated to determine whether the time for ending the round has been reached. If so, scoring of the round is performed in step 345 and the process circularly reverts to step 305. Optionally, after step 345 the process may proceed to Step 350 where the tags are saved.

Figure 4:
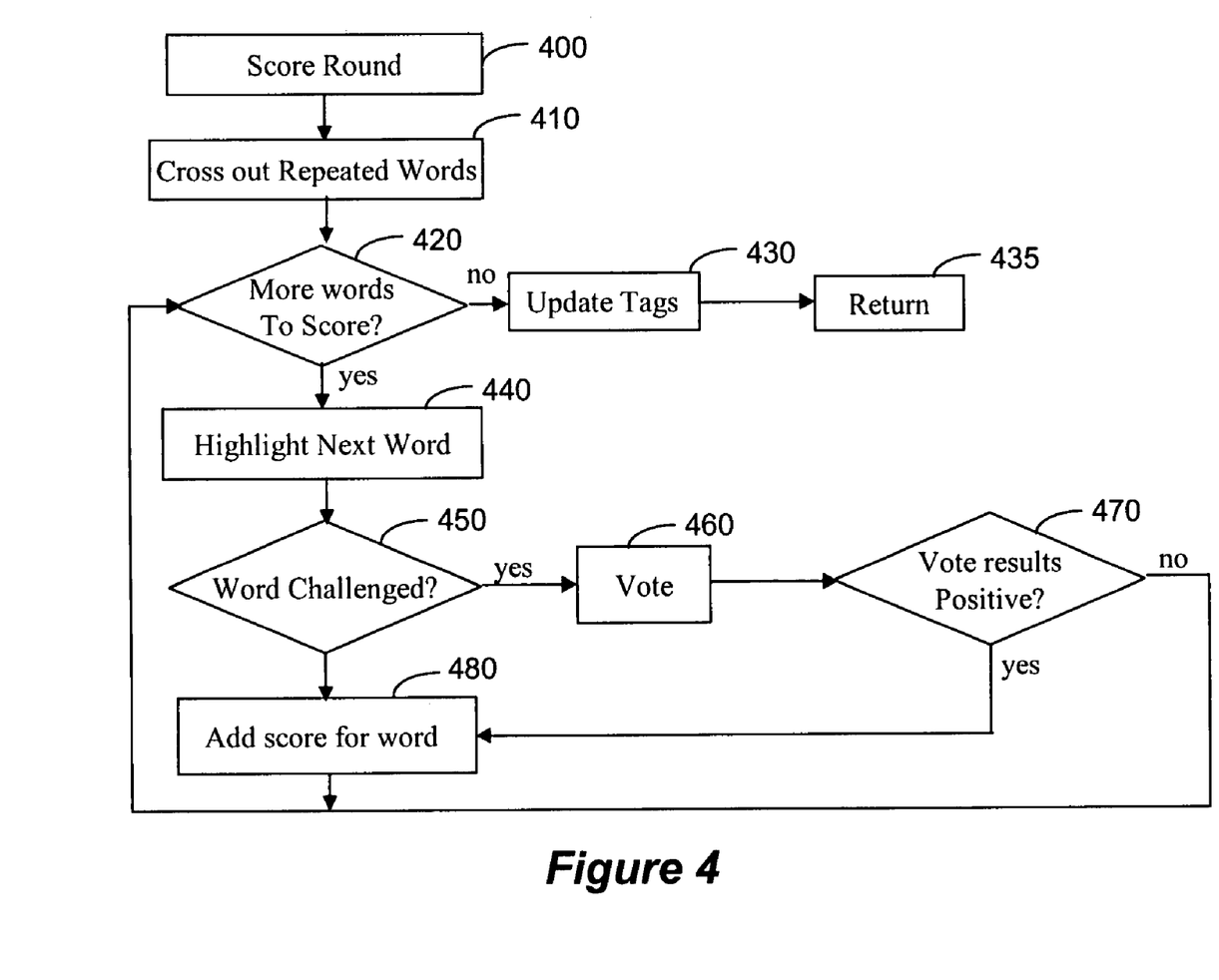
FIG. 4 is a flow diagram depicting the flow process for scoring according to an embodiment implemented for the example of FIG. 1.

FIG. 4 is a flow diagram depicting the flow process for scoring according to an embodiment implemented for the example of FIG. 1. The scoring process begins at step 400 and at step 410 repeated words are crossed out. At step 420 it is determined whether there are more words to score. If not, at step 430 the tags of the images are updated using the crossed out and the scored words and the process returns at 435 to step 305 of FIG. 3. If there are words to score at step 420 the process proceeds to step 440 where the next word to score is highlighted on the display. At step 450 it is determined whether any player challenged the highlighted word. If so, the process proceeds to step 460 for a vote and at step 470 it is determined whether the results of the vote are positive. If so, the score is added to the word in step 480 and the process circularly reverts to step 420. Similarly, if the results of the vote are not positive, the process circularly reverts to step 420. When a word is approved and scored, the word is added to the word tag area 110a-110d of the respective player.

Figure 5:
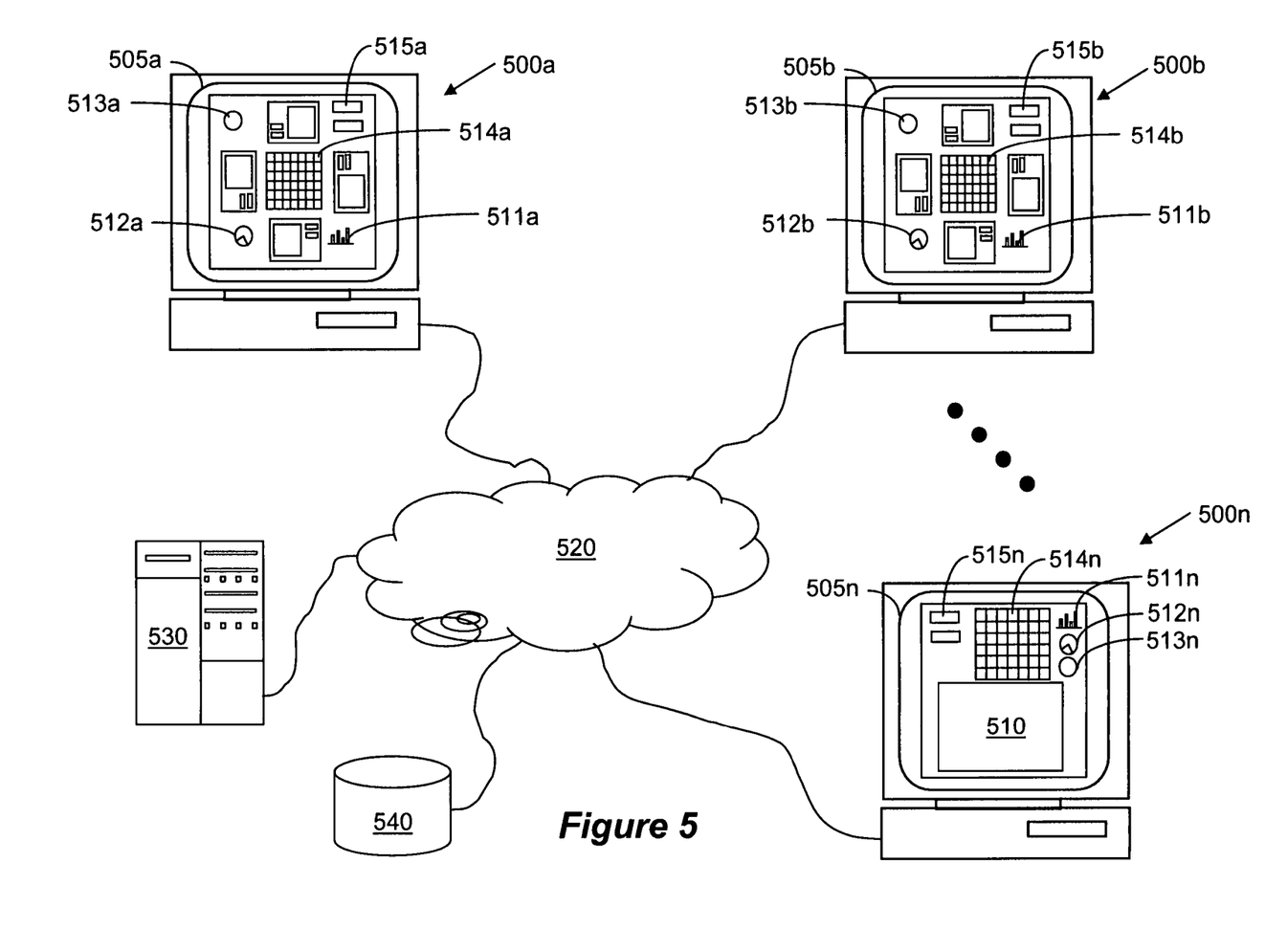
FIG. 5 depicts an embodiment wherein the invention is implemented in the form of multi-players using remotely located stations.

FIG. 5 depicts an embodiment wherein the invention is implemented in the form of multi-players using remotely located stations, such as, e.g., personal computers 500a-500n. In the example of FIG. 5 only three computers 500 are shown, however, the number of computers and the numbers of players can be changed. As shown in FIG. 5, the computers 500a-500n are interconnected via a networks 520, such as an intranet or the Internet. Additionally, other computing resources may be connected, such as server 530 and database 540. Using this arrangement, the inventive game may be implemented in various manners. For example, the entire game may be run on each computer 500a-500n separately and using the computing resources of each independent computer. On the other hand, the game may be run on server 530, while each of computers 500a-500n may run just a client, such as a Java applet. Similarly, the images to be tagged may reside on computers 500a-500n, on server 530, and or on database 540. The processing may be implemented according to the embodiments of FIGS. 2-4, as explained above.

As shown in FIG. 5, each computer 500a-500n includes a monitor 505a-505n displaying the game. The format displayed on screen 505a-505n may be similar to that shown in FIG. 1. Alternatively, or selectively, the display on the screen may include only parts of the game relevant to the particular user, while other information is hidden from that user. This is illustrated in the screen of computer 500n in FIG. 5. Notably, the image to be labeled by the user is shown at 510, while the other images are hidden from this user, but shown at the screens of each other respective user. In the embodiment of FIG. 1 the images were rotated on the same display, while in this example the images are "rotated" among the computers, i.e., each computer displays only a single images, which is changed every given period of time by an image that is displayed on a different computer. Other information is displayed at each screen, such the score 511, timer 512, challenge 513, and letter tiles 514. In this embodiment the challenge button need not be an active button, but rather just an indicator to indicate that someone has pressed a challenge button. Alternatively, the challenge button may be an icon that can be activated by a click on a mouse. The game may be controlled using conventional computing input devices, such as keyboard, mouse, trackball, etc. Alternatively, or on addition, specialized gamming input devices may be used, such as joysticks, etc.

As can be understood from the embodiment of FIG. 5, according to another embodiment the game may be played as a solitary game. In that embodiment the screen may display the game in the format such as shown in screen 505a, or such as shown in screen 505n. In this embodiment a word speller may be used to invoke a computer generated challenge to selected words when the spelling of the word differs from the speller's spelling. Otherwise, i.e., if no challenge was invoked, the user's selection is accepted. Of course, the spell checker feature may also be used in the other embodiments, either to invoke a challenge or to assist in voting after a challenge was invoked.

The present invention has been described in relation to particular examples, which are intended in all respects to be illustrative rather than restrictive. Those skilled in the art will appreciate that many different combinations of hardware, software, and firmware will be suitable for practicing the present invention. Moreover, other implementations of the invention will be apparent to those skilled in the art from consideration of the specification and practice of the invention disclosed herein. Various aspects and/or components of the described embodiments may be used singly or in any combination. It is intended that the specification and examples be considered as exemplary only, with a true scope and spirit of the invention being indicated by the following claims.

The invention claimed is:

1. A computer game for tagging stored digital images, comprising:

a randomizer for selecting:

m images of the stored digital images, to be used in a game round, m being an integer larger than zero; and x letters of the alphabet, to be used in the game round, x being an integer larger than zero;

an image display for simultaneously displaying n images out of m images, n being an integer larger than zero, wherein said image display comprises a screen having n image display areas defined thereupon and wherein n=m and each of the n images is displayed on one of the display areas;

a letter tray for displaying a plurality of letter tiles, each letter tile representing one of the x letters;

a highlighter for selectively highlighting one of the letter tiles according to a user pointer;

a word tray enabling a user to construct words by selecting letter tiles from the letter tray;

a tag generator generating tags linking words constructed in the word tray to corresponding images of the n images; and a timer counting a time period T1, wherein after each period T1 each of the n images is displayed on a different one of the display areas.

2. The computer game of claim 1, wherein n=1.

3. The computer game of claim 2, further comprising a timer counting a time period T1, wherein after each period T1 a different image of the n images is displayed on the display.

4. The computer game of claim 1, wherein the x letters include duplicate letters but does not include all of the alphabet letters.

5. The computer game of claim 1, wherein the x letter tiles are divided to n groups of randomly selected letter tiles, and wherein the letter tiles of each of the n groups are oriented towards a corresponding one of the display areas.

6. The computer game of claim 5, wherein said timer counts a second time period T2, and wherein after each time period T2 the letter tiles of each group are oriented towards different one of the display areas.

7. The computer game of claim 1, further comprising a timer counting a time period T3, wherein each time period T3 designates a game round, and wherein the tag generator generates the tags only at the end of each time period T3.

8. The computer game of claim 7, further comprising a challenge indicator, enabling challenge of words constructed in the word tray.

9. The computer game of claim 8, wherein the challenge indicator is activated by a user, and wherein when a challenge is activated, a voting mechanism is initiated, enabling users to vote on the appropriateness of a challenged word, wherein if the vote is positive, said tag generator generates a tag and if the vote is negative the tag generator does not generate a tag.

10. The computer game of claim 8, further comprising a spell checker, wherein the spell checker verifies each word constructed in the word tray and when a word cannot be confirmed by the spell checker, the challenge indicator initiates a challenge to challenge the word.

11. A computer game for tagging stored digital images, comprising:

a randomizer for selecting:
   m images of the stored digital images, to be used in a game round, m being an integer larger than zero; and
   x letters of the alphabet, to be used in the game round, x being an integer larger than zero;

an image display for simultaneously displaying n images out of m images, n being an integer larger than zero, wherein said display comprises n screens and wherein n=m and each of the n images is displayed on one of the screens;

a letter tray for displaying a plurality of letter tiles, each letter tile representing one of the x letters;

a highlighter for selectively highlighting one of the letter tiles according to a user pointer;

a word tray enabling a user to construct words by selecting letter tiles from the letter tray;

a tag generator generating tags linking words constructed in the word tray to corresponding images of the n images; and a timer counting a time period T1, wherein after each period T1 each of the n images is displayed on a different one of the screens.

12. The computer game of claim 11, wherein the x letter tiles are divided to n groups of randomly selected letter tiles, and wherein the letter tiles of each of the n groups are oriented towards a corresponding one of the screens.

13. The computer game of claim 12, wherein said timer counts a second time period T2, and wherein after each time period T2 the letter tiles of each group are oriented towards different one of the screens.

14. The computer game of claim 11, wherein n=1.

15. The computer game of claim 14, further comprising a timer counting a time period T1, wherein after each period T1 a different image of the n images is displayed on the display.

16. The computer game of claim 11, wherein the x letters include duplicate letters but does not include all of the alphabet letters.

17. The computer game of claim 11, further comprising a timer counting a time period T3, wherein each time period T3 designates a game round, and wherein the tag generator generates the tags only at the end of each time period T3.

18. The computer game of claim 17, further comprising a challenge indicator, enabling challenge of words constructed in the word tray.

19. The computer game of claim 18, wherein the challenge indicator is activated by a user, and wherein when a challenge is activated, a voting mechanism is initiated, enabling users to vote on the appropriateness of a challenged word, wherein if the vote is positive, said tag generator generates a tag and if the vote is negative the tag generator does not generate a tag.

20. The computer game of claim 18, further comprising a spell checker, wherein the spell checker verifies each word constructed in the word tray and when a word cannot be confirmed by the spell checker, the challenge indicator initiates a challenge to challenge the word.

21. A method for generating tags for digital images, comprising:

for each game round performing the following steps:
   a. selecting m images of the digital images and displaying the m images on m display areas, wherein m is equal to the numbers of users playing the game round;
   b. selecting n number of letters of the alphabet, and displaying each of the n letters as a letter tile in a display area defined as a letter tray;
   c. enabling users to select letter tiles and, when a user selects a letter tile, displaying the letter tile in a user's display area defined as word tray;
   d. when sufficient letter tiles have been displayed in a word tray to form a word, enabling the user to select one of the m image;
   e. creating a tag associating the word with the selected image and storing the tag in a storage area so as to enable searching and browsing of the digital images using the tag; and
   f. counting time periods T1 and at each end of time period T1 exchanging the display area for displaying the m images.

22. The method of claim 21, further comprising the step:
   e. 1. when the user selects one of the m images, disabling, for a predetermined period of time, selection of letter tiles that were used to form the word.

23. The method of claim 21, wherein selecting n number of letters at step b comprises including duplicate letters but not including all of the alphabet letters.

24. The method of claim 21, wherein in step a, m is equal to the numbers of users playing the game round.

25. The method of claim 21, further comprising the step:
   d. 1. enabling other users to challenge the word and, if a challenge has been initiated, enabling all users to vote on the challenge.

* * * * *